US008528392B2

(12) United States Patent
Thomas et al.

(10) Patent No.: US 8,528,392 B2
(45) Date of Patent: Sep. 10, 2013

(54) DEVICE AND METHOD FOR DETERMINING THE OSCILLATORY BEHAVIOR OF A BRAKE LINING IN THE FIELD OF MOTOR VEHICLES

(75) Inventors: Claus Thomas, Leonberg (DE); Matthias Leber, Stuttgart (DE); Ingolf Eichmann, Bruchsal (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 117 days.

(21) Appl. No.: 13/080,872

(22) Filed: Apr. 6, 2011

(65) Prior Publication Data
US 2011/0239741 A1 Oct. 6, 2011

(30) Foreign Application Priority Data
Apr. 6, 2010 (DE) .......................... 10 2010 016 329

(51) Int. Cl.
*G01L 5/28* (2006.01)
*G01H 13/00* (2006.01)

(52) U.S. Cl.
USPC ................... 73/121; 73/570; 73/579; 73/581; 73/865.3

(58) Field of Classification Search
USPC .............................................. 73/121, 39, 669
See application file for complete search history.

(56) References Cited

U.S. PATENT DOCUMENTS

| 3,160,549 | A | * | 12/1964 | Caldwell et al. | ............ 428/317.3 |
| 4,899,999 | A | * | 2/1990 | Arnold | ........................... 269/240 |
| 6,145,382 | A | * | 11/2000 | Nagasawa et al. | ............... 73/664 |
| 6,382,027 | B1 | | 5/2002 | Uhlig | |
| 2010/0288038 | A1 | | 11/2010 | Wallaschek et al. | |

FOREIGN PATENT DOCUMENTS

| DE | 100 06 391 | | 8/2001 |
| DE | 10006391 A1 | * | 8/2001 |
| DE | 1002006020723 A1 | * | 8/2007 |
| DE | 10 2006 020 723 | | 11/2007 |
| DE | 10 2005 059 015 | | 4/2008 |

OTHER PUBLICATIONS

English translation of DE 100 06 391 A1.*
English translation of DE 100 2006 020 723 A1.*

* cited by examiner

*Primary Examiner* — Peter J Macchiarolo
*Assistant Examiner* — Irving A Campbell
(74) *Attorney, Agent, or Firm* — Gerald E. Hespos; Michael J. Porco; Matthew T. Hespos

(57) ABSTRACT

A device (1) and a method are provided for determining the oscillatory behavior of a brake lining (3) for a motor vehicle. The device (1) has a mounting device (2) for mounting a brake lining (3) and a securing device (6) for securing a brake disk model (7) assigned to the brake lining (3) so that the brake lining (3) can be brought to bear with the brake disk model (7) against a contact face (8). A pretensioning device (9) is coupled to the mounting device (2) and/or to the securing device (6) so that the brake lining (3) can be pressed against the brake disk model (7) with a pressure force (10, 10') predetermined in terms of absolute value and direction. An excitation device (13, 13') is provided for exciting oscillations of the brake disk model (7) and/or the brake lining (3).

20 Claims, 3 Drawing Sheets

DEVICE AND METHOD FOR DETERMINING THE OSCILLATORY BEHAVIOR OF A BRAKE LINING IN THE FIELD OF MOTOR VEHICLES

CROSS-REFERENCE TO RELATED APPLICATION

This application claims priority under 35 USC 119 to German Patent Application No. 10 2010 016 329.5, filed on Apr. 6, 2010, the entire disclosure of which is incorporated herein by reference.

BACKGROUND OF THE INVENTION

1. Field of the Invention

The invention relates to a device and a method for determining the oscillatory behavior of a brake lining in the field of motor vehicles.

2. Description of the Related Art

The invention can be applied to a wide variety of brakes, such as those used for braking road vehicles, rail vehicles, aircraft or other means of transportation, as well as moving machine components. However, the invention and the problems on which it is based will be explained in more detail below using the example of a disk brake for a motor vehicle, in particular for an automobile.

Disk brakes use brake piston to press a brake lining against a brake disk that is undergoing movement. The brake disk usually is connected to a rotating part, such as a hub of a wheel on a motor vehicle. Sliding friction occurs in the contact face between the brake lining and the brake disk during the braking with a disk brake of this type. The kinetic energy of the rotating disk resulting from this friction is consumed and converted into heat. Plural brake pistons often are used to achieve a more uniform distribution of contact pressure over the contact face between the brake lining and brake disk.

Brake disks may be manufactured, for example, from gray cast iron, but also from ceramic composite materials. Ceramic composite materials may be advantageous in this context due to their lower weight, reduced wear and reduced corrosion tendency. Brake disks made of special ceramic fiber composites, referred to as carbon ceramic brake disks, also are used in vehicles.

The frictional material that contacts the brake disk during the braking process is attached, for example bonded, to a carrier plate or back plate that usually is fabricated from metallic materials.

A brake lining is pressed onto the rotating brake disk during a braking process. The sliding and at the same time frictional relative movement between the brake lining and the brake disk may cause oscillations to be excited in the brake lining. These oscillations may entail braking noises that are felt to be very unpleasant, particularly in motor vehicles, and efforts therefore are made to reduce these noises as far as possible.

However, since the actual oscillating system which includes the brake lining and from which the braking noises do not occur until when at least the essential components of a given disk brake of a specific type of motor vehicle are assembled, the detailed investigation of the braking noise which occurs in the driving mode entails a high degree of expenditure.

A selected brake disk and a selected brake lining can be installed in a motor vehicle and test runs can be carried out to investigate the noise behavior of the selected type of brake lining and the selected brake disk. Definitive information about the oscillatory behavior of the brake lining can be obtained on the basis of measurements during the test runs. However, such test runs are costly and time-consuming. The enormous amount of time expended on systematically determining and assessing the oscillatory behavior of different brake linings in contact with different types of brake disks is a severe impediment. Investigations on a brake lining installed in a vehicle are made even more difficult due to the usually poor accessibility of the installed brake lining.

DE 10 2005 059 015 B4 describes a noise testing arrangement for a disk brake where a brake lining acts on a rotating brake disk. Excitation of the oscillating system that may lead to braking noise is brought about in this arrangement by the sliding friction between the brake lining and the brake disk.

A systematic assessment of the noise generation of given brake linings used with a disk brake of a given design desirably should determine the oscillatory behavior of the brake lining accurately without the result being influenced by unknown details of the sliding friction process that are difficult to determine and under certain circumstances that vary over the service life of the disk brake.

The invention is therefore based on the object of making available a device and a method which permit, with little expenditure, systematic determination of the oscillatory behavior of a brake lining which is largely isolated from disruptive influences.

SUMMARY OF THE INVENTION

A device for determining the oscillatory behavior of a brake lining in the field of motor vehicles has a mounting device for mounting a brake lining and a securing device for securing a brake disk model assigned to the brake lining. The process of securing the brake disk model is effected so that the brake lining can be brought to bear with the brake disk model against a contact face. A pretensioning device is coupled to the mounting device or the securing device. The pretensioning device presses the brake lining against the brake disk model with a pressure force that is predetermined in terms of absolute value and direction. Furthermore, the device has an excitation device for exciting oscillations of the brake disk model and/or of the brake lining. In this context, the excitation device can be coupled to the brake disk model and/or to the brake lining.

Adhesion can be generated between the brake disk model and the brake lining by the predetermined pressure force. Thus, no relative movement occurs at the contact face between the brake lining and the brake disk model, and sliding of the brake lining over the brake disk model at the contact face advantageously is avoided. As a result, oscillatory behavior of the brake lining can be determined independently of sliding friction influences.

The predetermined pressure force has a force component in a direction perpendicular to the contact face and a force component parallel to the contact face. As a result, the clamping or pressing of the brake lining against the brake disk model occurs with a pressure force in a way similar to the way a disk brake is used in a braking operation in a motor vehicle. In this context, the braking force, which usually is generated by hydraulic means in a motor vehicle and acts axially with respect to the brake disk, is simulated by the force component that is applied perpendicular to the contact face, while the force component that is applied parallel to the contact face simulates a brake disk torque. Thus, the oscillatory behavior of the brake lining advantageously can be investigated under conditions that are similar to the actual conditions of use.

The pretensioning device may have a tangential force spindle for applying a tangential force to the securing device in a direction parallel to the contact face. Additionally or alternatively, the pretensioning device may have an axial force spindle for applying an axial force to the mounting device in a direction perpendicular to the contact face. The use of spindles easily permits adjustment of the tangential force and/or of the axial force. The tangential force and/or the axial force can be varied to determine the oscillatory behavior of the brake lining by means of the device within predetermined limits. As a result, an overview of the oscillatory behavior of the brake lining under different load conditions or clamping conditions can be acquired.

The tangential force spindle and/or the axial force spindle may be hydraulic spindles and may be activated by a handle and a rotary lever. Thus, a user of the device can generate comparatively large tangential forces and axial forces manually without additional drive devices. In particular, it is possible to generate forces that are comparable in magnitude to those tangential and axial forces that act between the brake lining and the brake disk in a braking operation in a motor vehicle.

The pretensioning device may have a tangential force sensor for measuring the tangential force acting on the securing device. Additionally or alternatively, the pretensioning device may have an axial force sensor for measuring the axial force acting on the mounting device. The force sensors advantageously permit the forces to be measured and monitored for precise documentation of test conditions.

The securing device may be mounted to be displaced substantially parallel to the contact face to prevent statically overdetermined clamping the securing device when the brake lining is brought to bear against the brake disk model. In this way, essentially the entire tangential force applied to the securing device, in particular the tangential force applied by the pretensioning device using the tangential force spindle, advantageously can be applied to the contact face of the brake lining and of the brake disk model. This permits precise determination and monitoring of the tangential force applied to this contact.

The securing device may have at least one opening and a plunger of the excitation device can be plugged through the opening and coupled to the brake disk model or the brake lining. The opening provides easy access to the brake disk model. In contrast, such access cannot be achieved or can be achieved only at very high cost on a brake disk used in the motor vehicle. This advantageously permits the brake disk model to be excited even at locations that otherwise would be inaccessible.

The securing device may be embodied to secure a brake disk model with a substantially rectangular shape. A rectangular brake disk model can be manufactured in a simple, materially economical fashion.

The mounting device may have guide devices for guiding the brake lining. The guide devices correspond substantially to the guide devices provided for this purpose in a disk brake of a motor vehicle. Thus, the conditions under which the oscillatory behavior of the brake lining is determined are even more like the conditions of use of the brake lining during a braking operation.

Rigidity values of the securing device and of the mounting device preferably are selected so that their natural frequencies differ considerably from the natural frequencies of the brake lining, and in particular they are considerably higher than the latter. Thus, excitement of oscillations by the excitation device for determining the oscillatory behavior of the brake lining ensures that the natural frequencies are not excited, or are excited only negligibly, in a frequency range that is significant for the generation of braking noise.

A separation layer preferably is provided between the brake disk model and the securing device. The separation layer may have a foamed material that is formed with a polymer. As a result, oscillations of the brake disk model and of the securing device can be separated, thereby shielding the brake lining from influences that are disruptive for determining the oscillatory behavior of the brake lining.

The excitation device may be an electro-dynamic oscillation exciter. An electro-dynamic oscillation exciter is well suited for use in a modal analysis for determining the natural frequencies and natural oscillation forms of parts, such as the brake lining, and permits reproducible excitation of the brake disk model and/or of the brake lining with a precisely defined frequency.

Spatially extensive bodies can oscillate in three spatial directions. Thus, the excitation device preferably is coupled to the brake disk model and/or the brake lining so that oscillations can be excited in spatial directions inclined at a different angle with respect to the contact face of the brake lining and of the brake disk model, such as in a direction parallel to the contact face and in a direction perpendicular to the contact face. Thus, the most complete possible characterization of the oscillatory behavior of the brake lining advantageously is achieved.

A force sensor preferably measures forces applied dynamically to the brake disk model and/or the brake lining by the excitation device during the excitation of oscillations to improve documentation of the test conditions for subsequent evaluation.

The invention also relates to a method for determining oscillatory behavior of a brake lining of a motor vehicle. The method includes: mounting a brake lining by a mounting device and securing a brake disk model assigned to the brake lining by a securing device so that the brake lining bears the brake disk model against a contact face. The method further includes pressing the brake lining against the brake disk model with a pressure predetermined in terms of absolute value and direction. The pressing step may be carried out with a pretensioning device coupled to the mounting device and/or to the securing device. The method then includes excitation of oscillations of the brake disk model and/or of the brake lining by an excitation device that is coupled to the brake disk model and/or the brake lining. The method then can determine the oscillatory behavior of the brake lining in response to an oscillation of the brake disk model excited by the excitation device. Significantly, the method determines the oscillatory behavior, without the excitation of the oscillations occurring as a result of a sliding friction process whose details are unknown.

The method of the invention preferably includes generating adhesion between the brake disk model and the brake lining by means of the predetermined pressure force. As described above with respect to the device, this advantageously prevents sliding friction from affecting the determination of the oscillatory behavior of the brake lining.

The predetermined pressure force applied during the method of the invention preferably has a force component perpendicular to the contact face and a force component parallel to the contact face. Thus, the method advantageously subjects the brake lining to a simulated brake disk torque and to a simulated braking force so that the oscillatory behavior is investigated under conditions similar to the actual conditions of use.

The method preferably measures the predetermined pressure force in terms of absolute value and direction, in particular by decomposing the predetermined pressure force into a force component perpendicular to the contact face, and into a force component parallel to the contact face. Thus, forces and test conditions under which the oscillatory behavior of the brake lining is determined can be monitored and documented.

The step of excitation of oscillations preferably is carried out with an electro-dynamic oscillation exciter, which advantageously permits precise and reproducible excitation of oscillations, is used as an excitation device for exciting the oscillations.

The method may include excitation of oscillations in spatial directions inclined at a different angle with respect to the contact face of the brake lining and of the brake disk model, in particular in a direction parallel to the contact face and in a direction perpendicular to the contact face.

Before the excitation of oscillations the method may include arranging one or more acceleration pickups on the brake lining, in particular on a backplate of the brake lining. Additionally or alternatively, a further step before the excitation of oscillations may include arranging one or more acceleration pickups on the brake disk model. The acceleration pickups on the brake lining permit measurement of the response of the brake lining to the oscillations excited by the excitation device. The oscillatory behavior of the backplate on which the acceleration pickups are arranged can be considered characteristic of the oscillatory behavior of the entire brake lining. Acceleration pickups mounted on the brake disk model advantageously permit the response of the brake disk model to the excited oscillations to be measured.

The method may include varying the frequency of the oscillations that are excited by the excitation device in a predetermined frequency range for advantageously determining responses of the brake lining to excitation at a different excitation frequency.

The method may also include a modal analysis evaluation of acceleration signals generated by the acceleration pickups during the excitation of oscillations to determine the oscillatory behavior of the brake lining. In particular, the modal analysis may investigate the oscillation forms of the brake lining according to spatial directions, separated in terms of their amplitude behavior and phase behavior. As a result, it becomes possible to acquire an overview of the oscillatory behavior of the brake lining.

Modal parameters of the brake lining may be determined in the modal analysis by evaluating the acceleration signals. This may include determining the natural frequencies and the natural oscillation forms of the brake lining.

The excitation of oscillations and the modal analysis may form a testing step that may be carried out repeatedly. Between executing individual testing steps the brake lining may be provided successively with various devices for changing its oscillatory behavior. The devices may include damping plates embodied and/or arranged in various ways and/or detuning masses embodied and/or arranged in various ways. In this way, the method can determine how the arrangement of different damping plates and detuning masses, separately or in combination, can affect the modal analysis and therefore the natural oscillation forms and natural frequencies of the brake lining. It is therefore possible to determine whether certain selected devices for changing the oscillatory behavior of the brake lining bring about a previously defined, desired change in this behavior.

The method may further include varying the predetermined pressure force in terms of absolute value and/or direction between the execution of individual testing steps. Thus, the response of the brake lining to the excitation of oscillations for a series of different braking forces and brake disk torques is determined to acquire an even more comprehensive picture of the oscillatory behavior of the brake lining.

The method may include selecting and arranging devices, such as damping plates and detuning masses, for changing the oscillatory behavior, in particular suitably shifting resonant frequencies of the brake lining and/or damping amplitudes of one or more oscillation forms of the brake lining and/or to extinction of a first torsion mode of the brake lining, on the basis of results of the modal analyses carried out during the testing steps. Thus, the method advantageously acquires definitive information as to what extent a brake lining of a specific type mounted in a predefined way interacts with a specific brake disk material and whether predefined demands made of the oscillatory behavior of the brake lining are met. The method also can determine measures suitable for meeting these demands. Such definitive information advantageously is made available before complex test runs with test vehicles are equipped with measuring equipment.

The above refinements and developments can, where appropriate, be combined with one another in any desired way. Further possible refinements, developments and implementations of the invention also comprise combinations which are not explicitly specified of features described below or above and which relate to the exemplary embodiments of the invention. A person skilled in the art will also add individual aspects as improvements or supplements to the respective basic form of the invention.

The invention is explained in more detail below on the basis of exemplary embodiments and with reference to the accompanying figures.

DETAILED DESCRIPTION OF PREFERRED EMBODIMENTS

Figure 1:
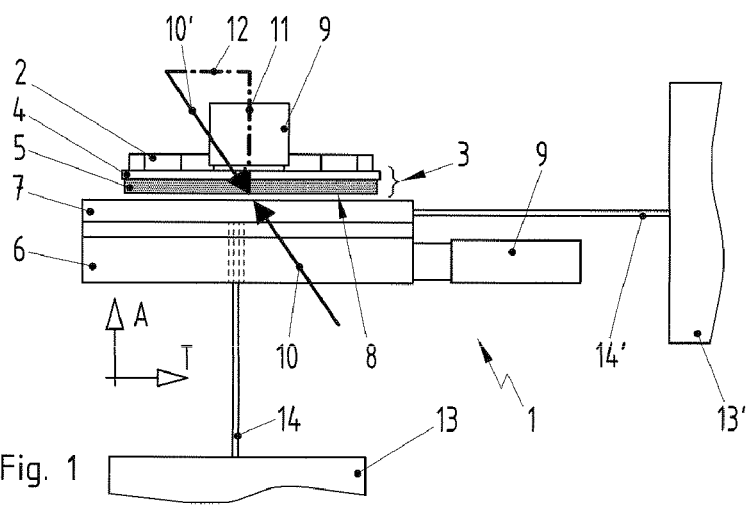
FIG. 1 is a schematic plan view of a device for determining the oscillatory behavior of a brake lining for a motor vehicle according to an embodiment of the invention.

In the figures of the drawing, the same reference symbols denote identical or functionally identical components unless otherwise stated.

FIG. 1 is a schematic plan view of a device 1 for determining the oscillatory behavior of a brake lining in the field of motor vehicles according to an exemplary embodiment of the invention. As is shown by FIG. 1, the device 1 has a mounting device 2 for mounting a brake lining 3. As is also apparent from FIG. 1, the brake lining 3 contains a backplate 4 to which a frictional material 5 is attached. In addition, the device 1 in FIG. 1 has a securing device 6 for securing a brake disk model 7 that is assigned to the brake lining 3. The brake disk model 7 is secured by the securing device 6 in such a way that the brake lining 3 can be brought to bear with the brake disk model 7 against a contact face 8 that can be a planar face as illustrated in FIG. 1.

The device 1 also has a pretensioning device 9 that is coupled to the mounting device 2 and to the securing device 6 for pressing the brake lining 3 against the brake disk model 7 with a predetermined pressure force 10, 10'. As is apparent from FIG. 1, the force 10 applied to the brake lining 3 is equal, in terms of absolute value and direction, to a force 10' that is applied to the brake disk model 7, only the signs of the forces 10, 10' differ from one another. The force 10' is inclined in space with respect to the contact face 8, as illustrated in FIG. 1 and has force components 11 and 12 aligned respectively in a direction A that is perpendicular to the contact face 8 and in a direction T that is parallel to the contact face 8. The direction A is referred to below as an axial direction, and the direction T as a tangential direction.

The reference numerals 13, 13' in FIG. 1 illustrate two possible positions of an excitation device that can be coupled to the brake disk model 7 and/or to the brake lining 3 to excite oscillations of the brake disk model 7 and/or of the brake lining 3. The reference numerals 14, 14' in FIG. 1 illustrate plungers that can couple the respective excitation device 13, 13' to the brake disk model 7. For example, the excitation device 13 and its plunger 14 excite oscillations of the brake disk model 7 in the directions A which are perpendicular to the contact face 8. On the other hand, the excitation device 13' and its plunger 14' are disposed and oriented so that excitation of the brake disk model 7 can occur in the direction T which is parallel to the contact face 8. Excitation of oscillations in the directions A and T may be advantageous, but are only exemplary orientations and it is perfectly possible to orient the excitation device in a way so that excitation can be carried out at a different angle of incline with respect to the contact face.

The excitation device 13, 13' also can be coupled to the brake lining 3 and can cause the brake lining 3 to be excited to oscillate in the axial direction A. With this arrangement, the brake disk model 7 may have one or more openings (not illustrated in FIG. 1) so that the plunger 14 can be fed through an opening to the brake lining 3.

The pretensioning device 9 of FIG. 1 presses the frictional material 5 of the brake lining 3 against a surface of the brake disk model 7 with the predetermined pressure force 10, 10' so that the brake lining 3 bears against the brake disk model 7 at the contact face 8. The excitation device 13, 13' is activated when a predetermined pressure force 10, 10' and causes the brake disk model 7 to oscillate.

Figure 2:
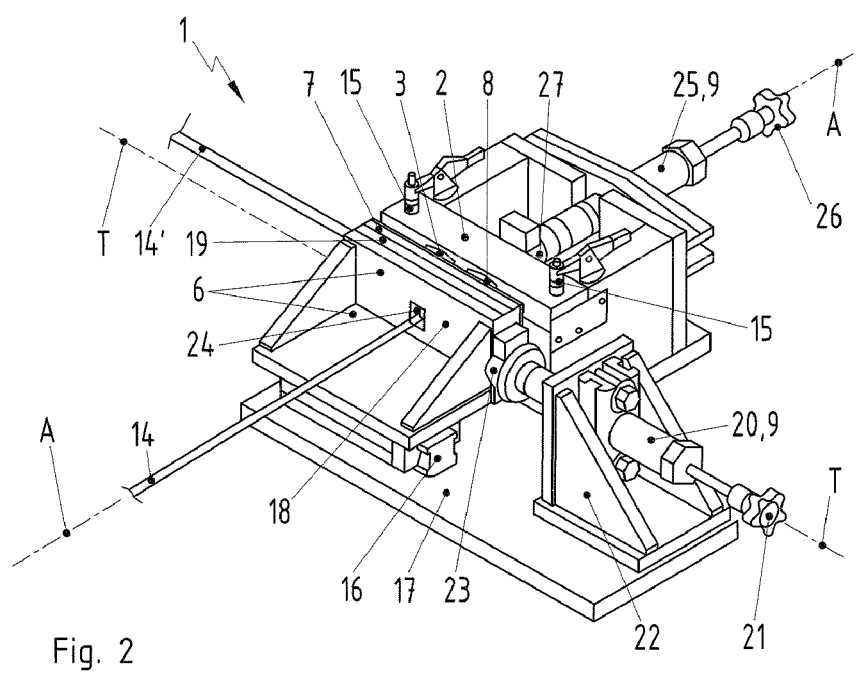
FIG. 2 is a schematic perspective view of a device for determining the oscillatory behavior of a brake lining for a motor vehicle according to a further embodiment of the invention.

FIG. 2 shows a further exemplary embodiment of a device 1 for determining the oscillatory behavior of a brake lining 3 in the field of motor vehicles. Similar to the embodiment of FIG. 1, the device 1 of FIG. 2 has a mounting device 2 for mounting a brake lining 3, a securing device 6 for securing a brake disk model 7 assigned to the brake lining 3, a pretensioning device 9 and an excitation device 13, 13' for exciting oscillations of the brake disk model 7 and/or of the brake lining 3. The brake lining 3 can be brought to bear against the brake disk model 7 at a contact face 8.

The mounting device 2 of the device 1 of FIG. 2 preferably is embodied so that the brake lining 3 can be mounted in the mounting device 2 essentially in the same way as the brake lining 3 is mounted in the brake caliper of a disk brake in a motor vehicle. The mounting device 2 can have guide devices (not shown) for guiding the brake lining 3. These guide devices correspond essentially to the guide devices provided for this purpose in a disk brake of a motor vehicle and preferably are embodied as guide bolts. These measures permit the oscillatory behavior of the brake lining 3 to be determined approximately under conditions of use. In addition, a spring (not illustrated) is provided to facilitate the centering of the brake lining 3 in a radial direction perpendicular to the plane spanned by the two directions A and T.

The mounting device 2 of FIG. 2 has quick-action closures 15 that permit part of the mounting device 2 modeled on a specific brake caliper variant of a disk brake of a motor vehicle to be removed and replaced by a part that permits the brake lining to be mounted and guided in a way that is analogous to another brake caliper variant. The device 1 therefore can be used in an extremely flexible way with respect to a wide variety of brake linings 3.

FIG. 2 also shows the securing device 6 for securing the brake disk model 7 which is fabricated, for example, from gray cast iron or from carbon ceramic. The securing device 6 is a carriage mounted to be displaceable linearly on a linear guide 16 and essentially parallel to the contact face 8. The linear guide 16 is arranged on a baseplate 17 of the device 1. The securing device 6 has a substantially rectangular plate 18 that has essentially the dimensions of the brake disk model 7. The brake disk model 7 is attached to a separation layer 19 that is provided on one side of the plate 18 and extends essentially perpendicularly to the plane spanned by the two directions A and T.

A tangential force spindle 20 is provided as part of the pretensioning device 9 of FIG. 2 and is a hydraulic spindle that can be activated by rotating a handle 21. The hydraulic spindle 20 can apply tangential forces that are of the order of magnitude of the forces acting during a braking process carried out with a motor vehicle and can be achieved by relatively small manual forces that can be applied easily by a user of the device 1. The tangential force spindle 20 is supported in a bearing block 22 attached to the baseplate 17 and activation of the tangential force spindle 20 applies a tangential force to the securing device 6 in a tangential direction T that is parallel to the contact face 8 of the brake lining 3 and the brake disk model 7. The application of the tangential force takes place in the exemplary embodiment by intermediate connection of a tangential force pickup or tangential force sensor 23 for measuring the applied tangential force.

The connections of the separation layer 19 to the plate 18 and to the brake disk model 7 advantageously can be bonded connections. The separation layer 19 is provided between the brake disk model 7 and the plate 18 of the securing device 6 to decouple oscillations of the brake disk model 7 from oscillations of the securing device 6. In this context, the separation layer 19 preferably has a foamed material formed with a polymer. The foamed material may be sufficiently rigid to transmit a tangential force from the pretensioning device 9 to the securing device 6 and from the plate 18 of the securing device 6 to the brake disk model 7. However, the foamed material also has sufficient flexibility to ensure decoupling of oscillations.

The plate 18 of the securing device 6 also has an opening 24 through which the plunger 14 of the excitation device 13 (not illustrated) can be plugged to excite oscillations of the brake disk model 7 in the axial direction A. In this context, the plunger 14 does not contact any of the side walls of the opening 24, but instead has play with respect to the opening 24. The separation layer 19 has an opening that is essentially congruent with the opening 24 in the plate 18 and through which the plunger 14 can also be plugged with a degree of play. As a result it is possible to couple the excitation device 13 to the brake disk model 7 by means of the plunger 14. The brake disk model 7 also has an opening that is essentially congruent with the opening 24 so that oscillations can be excited in the brake lining 3 in the axial direction A.

The excitation device 13, 13' preferably is an electro-dynamic oscillation exciter in the embodiment in FIG. 2, and can be arranged as in FIG. 1 so that the plunger 14' runs essentially in the tangential direction T.

The pretensioning device 9 also has an axial force spindle 25 for applying to the mounting device 2 a force in the axial direction A, which is perpendicular to the contact face 8 of the brake lining 3 and of the brake disk model 7. The axial force spindle 25 of FIG. 2 can be a hydraulic spindle and can be activated by rotating a handle 26 for adjusting the axial force.

The axial force spindle 25 of FIG. 2 preferably acts on a brake piston within the mounting device 2, via an axial force sensor 27 for measuring the axial force. The brake piston preferably has essentially the same shape and size as the brake piston of the disk brake in which the brake lining is used in the motor vehicle. If the disk brake has plural brake pistons, for example two, the mounting device 2 can also have plural brake pistons, for example two. This also contributes to permitting the oscillatory behavior of the brake lining 3 to be determined largely under the conditions to which it is subjected when used in a motor vehicle. The axial force spindle 25 acts on the brake piston or on the brake pistons if plural brake pistons are provided. The brake piston presses the brake lining 3 against the brake disk model 7. The brake pistons preferably are decoupled in terms of oscillation from the axial force spindle 25 by a further separation layer that can be formed from the same material as the separation layer 19 between the plate 18 and the brake disk model 7.

The vectorial sum of the axial force applied by the axial force spindle 25 and the tangential force applied by the tangential force spindle 20 form a predetermined pressure force 10, 10' that presses the brake lining 3 and the brake disk model 7 against one another at their contact face 8 which, in the embodiment in FIG. 2, is flat. The predetermined pressure force 10, 10' preferably is selected so that adhesion occurs between the brake disk model 7 and the brake lining 3. A sliding friction process between these two parts at the contact face 8 therefore is prevented.

The linear guide 16 prevents statically overdetermined clamping of the securing device 6 as the brake lining 3 and the brake disk model 7 are pressed against one another. Thus, essentially the entire tangential force applied to the securing device 6 by the tangential force spindle 20 is applied to the contact face 8 of the brake lining 3 and the brake disk model 7. The tangential force sensor 23 permits the force component acting in the tangential direction T at the contact face 8 to be known with high accuracy.

A further force censor 28 can be provided to measure the forces applied dynamically by the excitation device 2 to the brake disk model 7 and/or the brake lining 3 during the excitation of oscillations.

The rigidity values of the securing device 6 and the mounting device 2, as is shown in FIG. 2, preferably are dimensioned so that the natural frequencies of the securing device 6 and the mounting device 2 are considerably higher than the natural frequencies of the brake lining 3. This makes it possible to ensure that the natural oscillations of the securing device 6 or of the mounting device 2 are not excited, or are excited only to a negligible degree when oscillations are excited by the excitation device 13, 13' in a frequency range that is significant for the generation of braking noise.

Figure 3:
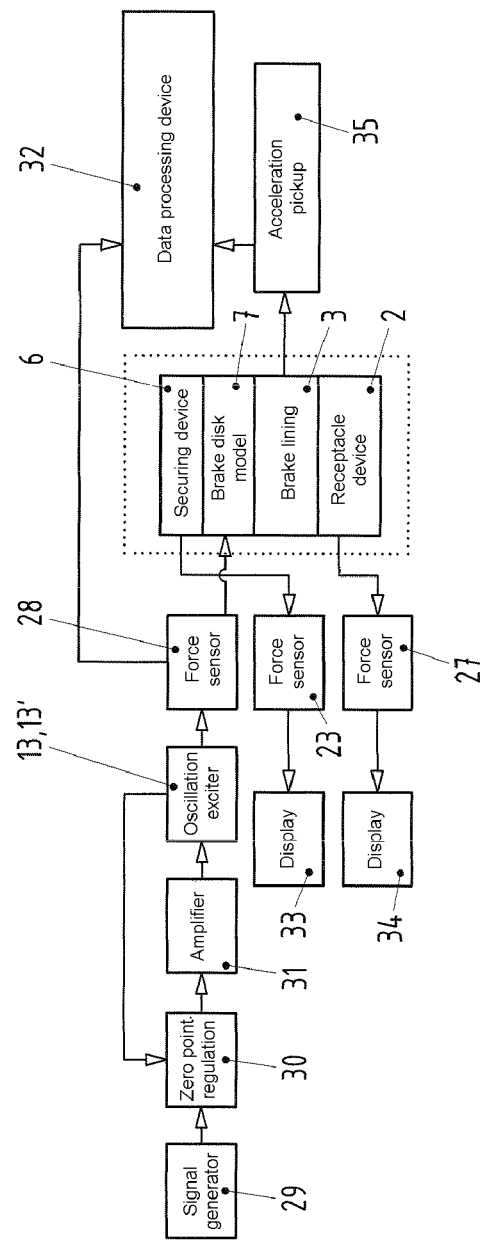
FIG. 3 shows a block diagram of the device according to FIG. 2.

FIG. 3 is a block diagram of the device 1 of FIG. 2. A signal generator 29, a device for zero point regulation 30 and an amplifier 31 are provided to generate a signal that represents the mechanical oscillation that is to be implemented by the excitation device 13, 13'. The amplifier 31 amplifies the signal that is fed to the electro-dynamic oscillation exciter 13, 13', which converts the signal of the signal generator 29 into a mechanical oscillation. The mechanical oscillation is applied to the brake disk model 7 for the excitation of oscillations thereof, with the intermediate connection of a force sensor 28 for measuring the dynamically applied forces. The dynamic force measured by the force sensor 28 is passed on, in the form of a signal generated by the force sensor 28, to a data processing device 32 for processing and, if desired, for storage. The data processing device 32 preferably comprises a personal computer (PC) such as is generally known.

As is also shown by FIG. 3, force sensors 23 and 27 measure the tangential force applied to the securing device 6 by the tangential force spindle 20, and the axial force applied to the mounting device 2 by the axial force spindle 25. Forces measured by the force sensors 23 and 27 are displayed to a user of the device 1 by display devices 33 and 34. As a result, the user can monitor the measured forces as he operates the device 1, in particular during manual adjustment of the tangential and axial forces.

At least one acceleration pickup 35 can be arranged on the backplate 4 of the brake lining 3. Acceleration signals generated by the acceleration pickups 35 are passed on to the data processing device 32 where they can be stored and further processed if required. The acceleration signals generated by the acceleration pickups 35 include the response of the brake lining 3 to the excitation by the oscillation exciter 13, 13'. The data processing device 32 enables a modal analysis to be carried out according to a predefined calculation rule, and the results can be output, for example, in graphic form. Alternatively or additionally, acceleration pickups 35 are arranged on the backplate 4 of the brake lining 3. Acceleration pickups also can be on the brake disk model. The signals thereof can be transferred to the data processing device 32, stored and further processed if desired.

The excitation device 13, 13', the force sensors 23, 27 and 28 and the acceleration pickups 35 of the embodiment of FIG. 2 cooperate with the data processing device 32 to measure oscillation frequencies of approximately 10 kHz.

Figure 4:
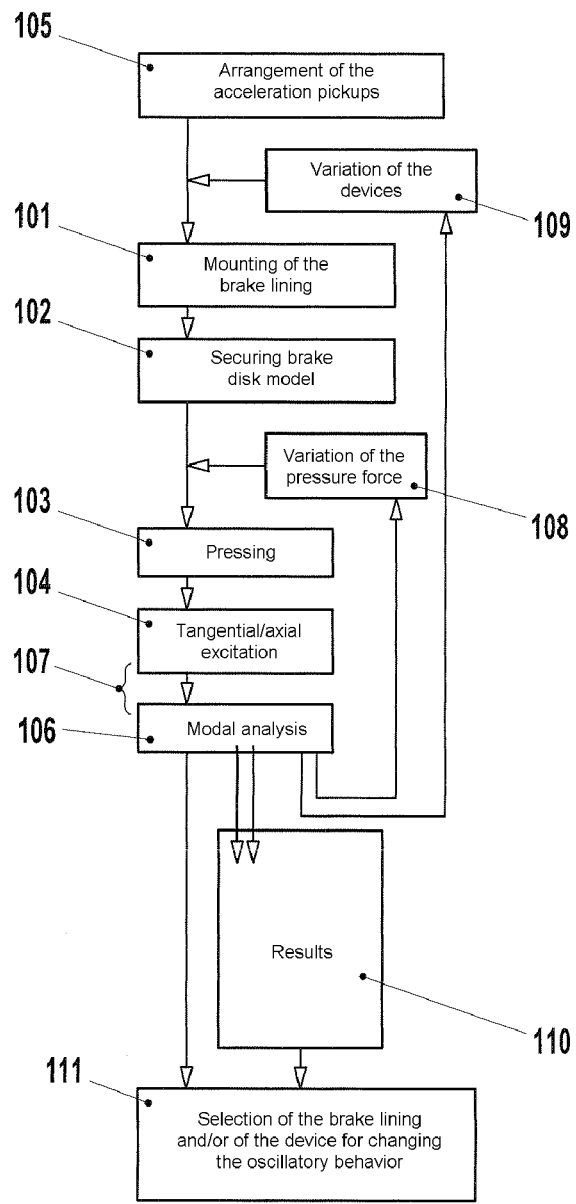
FIG. 4 is a flowchart illustrating a method for determining the oscillatory behavior of a brake lining for a motor vehicles according to an embodiment of the invention.

FIG. 4 is a flowchart that illustrates a method for determining the oscillatory behavior of a brake lining in the field of motor vehicles. The method can, for example, be carried out with the device 1 described with reference to FIGS. 1 to 3.

In a step 101, a brake lining 3 is mounted by a mounting device 2. In a further step 102, a brake disk model 7 assigned to the brake lining 3 is secured by a securing device 6 so that the brake lining 3 bears against the brake disk model 7 at a contact face 8. In a step 103, a pretensioning device 9 coupled to the mounting device 2 and/or the securing device 6 presses the brake lining 3 against the brake disk model 7 to achieve a pressure force 10, 10' that is predetermined in terms of absolute value and direction. In this context, the predetermined pressure force 10, 10' preferably generates adhesion between the brake disk model 7 and the brake lining 3. It is therefore impossible for the brake disk model 7 to slide in relation to the brake lining 3, but instead the brake lining 3 and the brake disk model 7 are at rest in relation to one another. Thus, the predetermined pressure force 10, 10' acts at their contact face 8 with a force component 11 in an axial direction A perpendicular to the contact face 8 and with a force component 12 in a tangential direction T parallel to the contact face 8. The predetermined pressure force 10, 10' advantageously is measured in terms of absolute value and direction by decomposing the pressure force 10, 10' into a force component 11 in the direction A and a force component 12 in the direction T, using, for example, force sensors 23, 27.

Step 104 comprises using an excitation device 13, 13' coupled to the brake disk model 7 and/or to the brake lining 3 for excitation of oscillations of the brake disk model 7 and/or of the brake lining 3. The excitation device 13, 13' can be carried out with an electro-dynamic oscillation exciter, which is favorable for precise and reproducible excitation of oscillations and therefore precise determination of the oscillatory behavior of the brake lining 3. The implementation of step 104 includes varying the frequency of the oscillations excited by the excitation device 13, 13' in a predetermined frequency range. The excitation can take place in directions that are inclined at different angles with respect to the contact face 8 of the brake lining 3 and of the brake disk model 7, but excitation in the direction T (tangential excitation) and in the direction A (axial excitation) is preferred.

Step 105 includes arranging one or more acceleration pickups 35 on the brake lining 3 before the brake lining 3 is mounted by the mounting device 2. The acceleration pickups 35 enable measuring the response of the brake lining 3 to the excitation and can be arranged on a backplate 4 of the brake lining so that measurements are possible over the entire backplate 4 of the brake lining 3. One or more acceleration pickups 35 also can be arranged on the brake disk model 7, if desired.

Step 106 includes evaluating acceleration signals generated by the acceleration pickups 35 during the excitation of oscillations in step 104 to determine the oscillatory behavior of the brake lining 3. This evaluation can take place in the form of a modal analysis 106 during which the oscillation forms of the brake lining 3 are investigated according to spatial directions, separated in terms of amplitude behavior and phase behavior. In particular, the modal analysis 106 permits the modal parameters, such as the natural frequencies and natural oscillation forms of the brake lining 3, to be determined.

The steps of the excitation of oscillations 104 and of the modal analysis 106 together form a testing step 107. As shown in FIG. 4, it is possible, subsequent to a testing step 107, firstly to vary the pressure force 10, 10' in step 108. The brake lining 3 is then pressed against the brake disk model 7, and the testing step 107 carried out again. Carrying out the testing step 107 repeatedly in this way makes it possible to acquire knowledge about how the results of the modal analysis 106 vary with different loading of the brake lining 3 by the pressure force 10, 10'.

Between the execution of individual testing steps 107, the brake lining 3 is preferably equipped in succession with different devices for changing its oscillatory behavior. This is also shown in FIG. 4. The devices for changing the oscillatory behavior of the brake lining 3 are, in particular, damping plates which are embodied in different ways and/or arranged in different ways, but also as an alternative or in addition to the damping plates, detuning masses which are embodied in different ways and/or arranged in different ways on the brake lining 3. The damping plates are used, for example, to damp the amplitudes of oscillations of the brake lining 3, while the detuning masses can influence the natural frequencies and the natural oscillation forms of the brake lining 3.

As illustrated in FIG. 4, after the execution of a testing step 107 the arrangement and/or the selection of the devices for changing the oscillatory behavior of the brake lining 3 can be changed in step 109. After renewed mounting 101 of the brake lining 3 in the mounting device 2, the steps 102, 103, 104 and 106 follow, as described above.

The results of the modal analyses 106 which are carried out in succession can be stored and suitably processed in step 110, using, for example, a data processing device 32. In particular, the modal parameters of the brake lining 3, for example the natural oscillation forms and natural frequencies thereof, can be determined using the data processing device 32.

The knowledge thereof can be used in a subsequent step 111 to compare with one another different brake linings 3 whose oscillatory behavior has been determined using the method described above, and to select the one which appears most suitable for use in a given disk brake of a motor vehicle. Furthermore, it is possible to assess the effectiveness of different measures for changing the oscillatory behavior of the brake lining 3. With the described method it is possible to obtain quantitative and qualitative definitive information as to whether such measures which comprise, in particular, the attachment of detuning masses and/or damping plates achieve desired effects. The desired effects include, in particular, suitable shifting of the resonant frequencies of the brake lining 3 to lower frequencies and, as an addition or as an alternative thereto, damping of the amplitudes of one or more oscillation forms of the brake lining. It is also possible to aim at extinction of a first torsion mode of the brake lining 3. The described method makes it possible to check to what extent these desired changes are possible with a certain combination of devices for changing the oscillatory behavior with a given brake lining 3. The method described with reference to FIG. 4 therefore also makes it possible to create for a multiplicity of brake lining types data records which characterize the oscillatory behavior of these brake linings. Given a preselection of a brake lining, for example for a new kind of disk brake, such data records can contribute to efficient processes in order to reduce the time involved and the corresponding costs.

Although the invention has been described above on the basis of preferred exemplary embodiments, it is not restricted thereto but rather can be modified in a variety of ways without departing from the subject matter of the present invention.

In particular, the invention is not restricted to excitation in the tangential and axial directions defined above. Instead it is conceivable also to excite oscillations in a radial direction, that is to say in a direction which is perpendicular with respect to the plane spanned by the axial and tangential directions.

What is claimed is:

1. A device for determining the oscillatory behavior of a brake lining for a motor vehicle, having:
   a mounting device for mounting a brake lining;
   a securing device for securing a brake disk model assigned to the brake lining so that the brake lining can be brought to bear with a contact face of the brake disk model;
   pretensioning devices configured for coupling to at least one of the mounting device and the securing device, the pretensioning devices being operative for pressing the brake lining against the brake disk model in at least two predetermined intersecting directions with pressure forces having a predetermined absolute values sufficient to prevent sliding friction movement between the brake lining and the brake disk model; and
   at least one excitation device configured for coupling to at least one of the brake disk model and the brake lining and operative for exciting oscillations of at least one of the brake disk model and the brake lining.

2. The device of claim 1, wherein the pretensioning devices are operative for producing the predetermined pressure forces that are sufficient for generating adhesion between the brake disk model and the brake lining.

3. The device of claim 1, wherein the pretensioning devices comprises an axial pretensioning device aligned for producing a predetermined axial pressure force that is perpendicular to the contact face and a tangential pretensioning device for producing a predetermined tangential pressure force that is parallel to the contact face.

4. The device of claim 1, wherein the pretensioning devices include a tangential force spindle for applying a tangential force to the securing device in a direction that is parallel to the contact face and an axial force spindle for applying an axial force to the mounting device in a direction that is perpendicular to the contact face.

5. The device of claim 4, wherein the pretensioning devices include a tangential force sensor for measuring the tangential force acting on the securing device and an axial force sensor for measuring the axial force acting on the mounting device.

6. The device of claim 1, wherein the securing device is displaceable with respect to the mounting device in a linear direction substantially parallel to the contact face to prevent statically overdetermined clamping of the securing device when the brake lining bears against the brake disk model.

7. The device of claim 1, wherein the securing device has at least one opening and the excitation device having a plunger that can be plugged through the opening and coupled to the brake disk model or the brake lining for exciting oscillations of the brake disk model or of the brake lining.

8. The device of claim 1, further comprising a separation layer between the brake disk model and the securing device, the separation layer having a foamed material that is formed with a polymer.

9. The device of claim 1, characterized in that the excitation device is an electro-dynamic oscillation exciter.

10. The device of claim 1, wherein the at least one excitation device comprises two excitation devices acting from different directions.

11. A method comprising:
mounting a brake lining to a mounting device;
securing a brake disk model assigned to the brake lining to a securing device so that the brake lining opposes a contact face of the brake disk model;
pressing the contact face of the brake lining against the brake disk model in at least two predetermined intersecting directions with pressure forces having predetermined absolute values sufficient to prevent sliding movement between the brake lining and the brake disk model at the contact face, the pressing being carried out by pretensioning devices coupled to at least one of the mounting device and the securing device; and
exciting oscillations of at least one of the brake disk model and the brake lining by at least one excitation device that is coupled to at least one of the brake disk model and the brake lining.

12. The method of claim 11, further comprising generating adhesion between the brake disk model and the brake lining by means of the predetermined pressure forces.

13. The method of claim 11, further comprising orienting the predetermined pressure forces to have a force component in a direction that is perpendicular to the contact face, and a force component in a direction that is parallel to the contact face.

14. The method of claim 13, further comprising measuring the predetermined pressure forces in terms of absolute value and direction by decomposing the predetermined pressure forces into a force component in a direction perpendicular to the contact face, and into a force component in a direction parallel to the contact face.

15. The method of claim 11, further comprising using an electro-dynamic oscillation exciter as an excitation device for exciting the oscillations.

16. The method of claim 11, further comprising arranging at least one acceleration pickup on a backplate of the brake lining or on the brake disk model before the excitation of oscillations.

17. The method of claim 16, further comprising using the acceleration pickups to generate acceleration signals during the excitation of oscillations and performing a modal analysis for evaluating the acceleration signals to determine the oscillatory behavior of the brake lining according to spatial directions, separated in terms of amplitude behavior and phase behavior.

18. The method of claim 17, wherein the excitation of oscillations and the modal analysis form a testing step carried out repeatedly, and in that, between the execution of individual testing steps, the brake lining is successively provided with damping plates or detuning masses for changing its oscillatory behavior.

19. The method of claim 18, further comprising varying the predetermined pressure forces in terms of absolute value or direction between executing individual testing steps.

20. The method of claim 18, further comprising providing the damping plates and detuning masses in an arrangement for shifting resonant frequencies of the brake lining, for damping amplitudes of one or more oscillation forms of the brake lining or for extinction of a first torsion mode of the brake lining.

* * * * *